S. ANTHONY.
CARD INDEX.
APPLICATION FILED APR. 8, 1918.
1,330,509.
Patented Feb. 10, 1920.
5 SHEETS—SHEET 1.
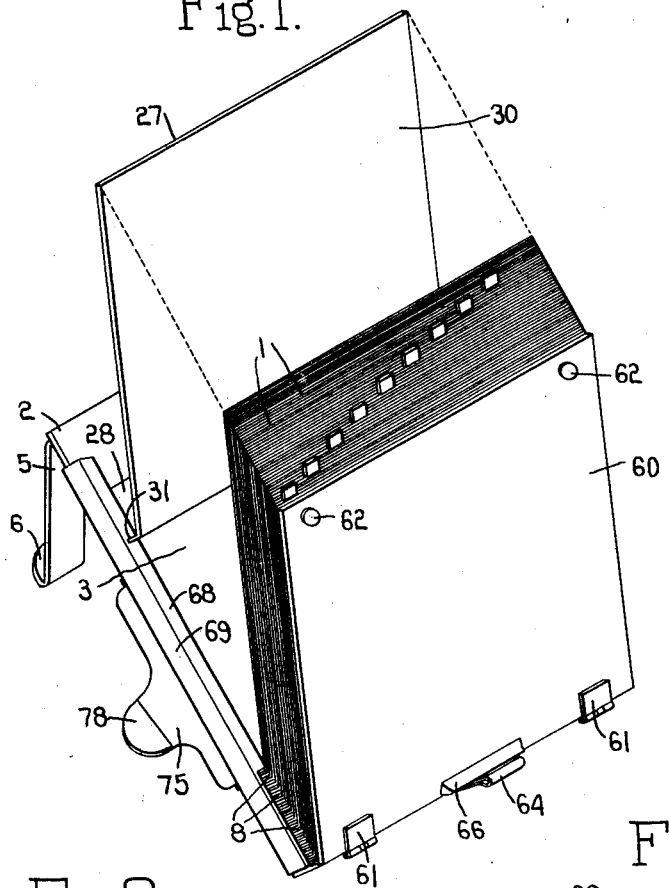
Fig. 1.
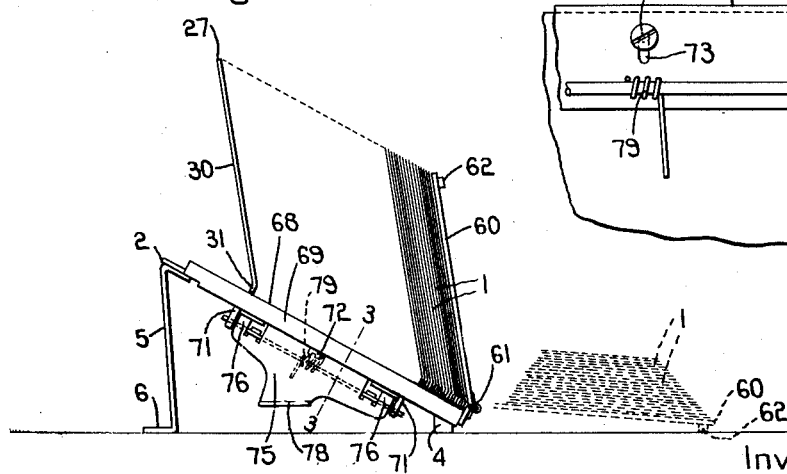
Fig. 2.
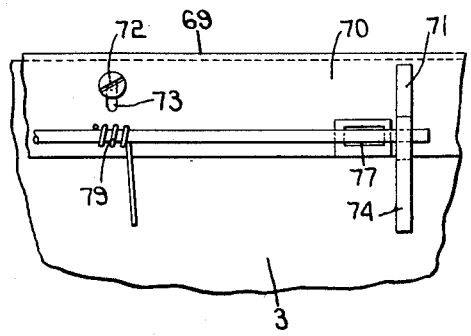
Fig. 2ᵃ.
Inventor.
Stanley Anthony
by Heard Smith & Tennant
Attys

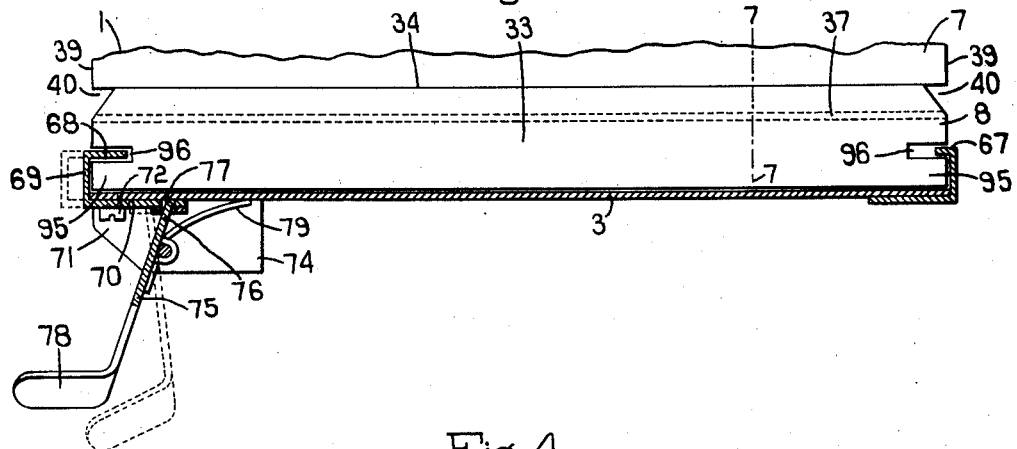
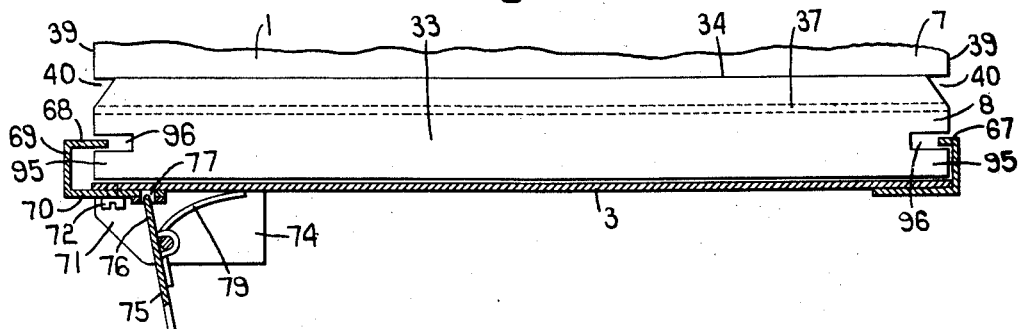
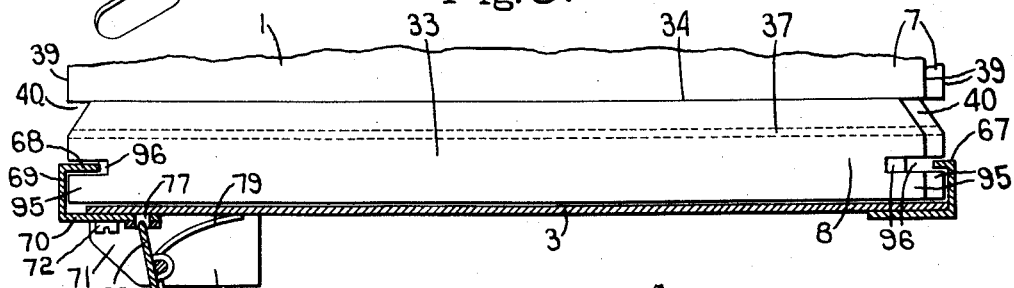
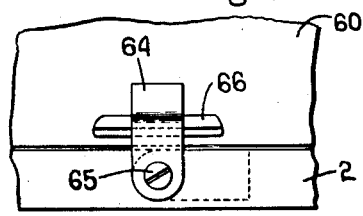
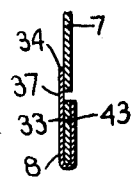

S. ANTHONY.
CARD INDEX.
APPLICATION FILED APR. 8, 1918.

1,330,509.

Patented Feb. 10, 1920.
5 SHEETS—SHEET 3.

Inventor.
Stanley Anthony
by Heard Smith & Tennant.
Attys.

S. ANTHONY.
CARD INDEX.
APPLICATION FILED APR. 8, 1918.
1,330,509.
Patented Feb. 10, 1920.
5 SHEETS—SHEET 4.
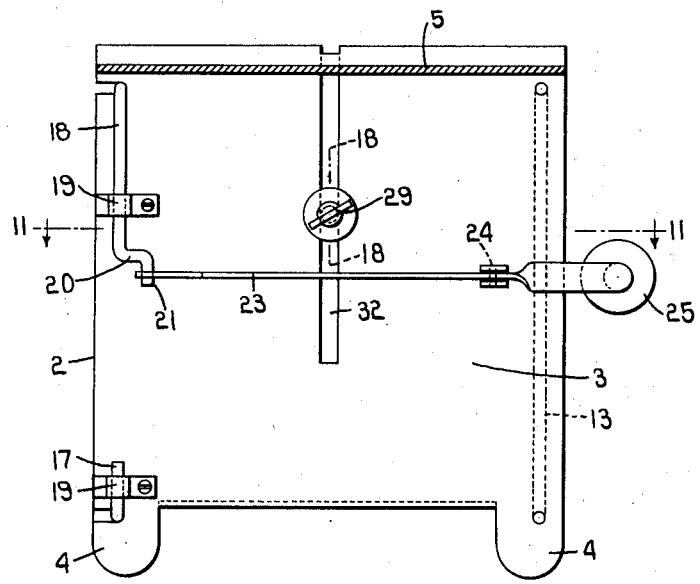
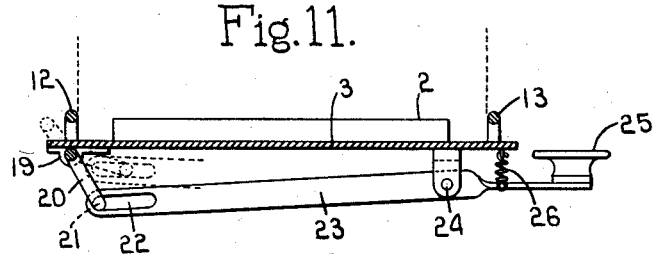
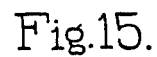
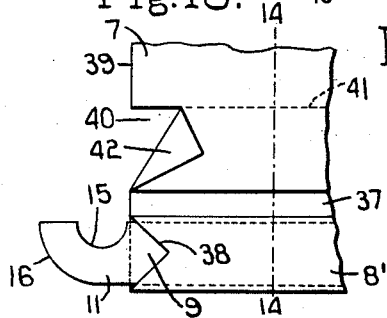
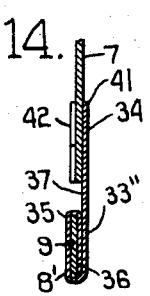
Inventor.
Stanley Anthony
by Heard Smith & Tennant
Attys.

S. ANTHONY.
CARD INDEX.
APPLICATION FILED APR. 8, 1918.

1,330,509.

Patented Feb. 10, 1920.
5 SHEETS—SHEET 5.

Inventor.
Stanley Anthony
by Heard Smith & Tennant.
Attys.

UNITED STATES PATENT OFFICE.

STANLEY ANTHONY, OF BOSTON, MASSACHUSETTS.

CARD-INDEX.

1,330,509.

Specification of Letters Patent.

Patented Feb. 10, 1920.

Application filed April 8, 1918. Serial No. 227,168.

*To all whom it may concern:*

Be it known that I, STANLEY ANTHONY, a citizen of the United States, residing at Boston, county of Suffolk, State of Massachusetts, have invented an Improvement in Card-Indexes, of which the following description, in connection with the accompanying drawing, is a specification, like characters on the drawing representing like parts.

This invention relates to card indexes of that type which comprise a frame, a plurality of index cards, each presenting a stub portion and a leaf portion hinged together, and means for securing the stub portion of the index cards to the frame, which means permits each card to be independently removed.

The object of the invention is to provide a card index of this type which has an improved form of index card, an improved means for detachably securing the individual cards to the frame, and other improvements, all as will be more fully hereinafter set forth.

In order to give an understanding of my invention, I have illustrated in the drawing some selected embodiments thereof which will now be described, after which the novel features thereof will be pointed out in the appended claims.

Figure 1 is a perspective view of a card index embodying my invention;

Fig. 2 is a side view thereof;

Figure 8:
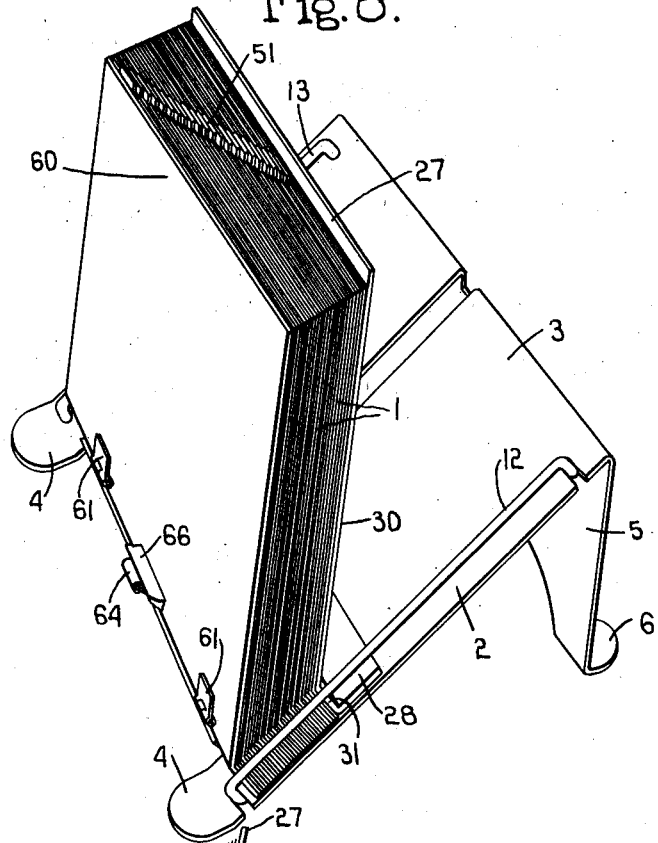
Figure 9:
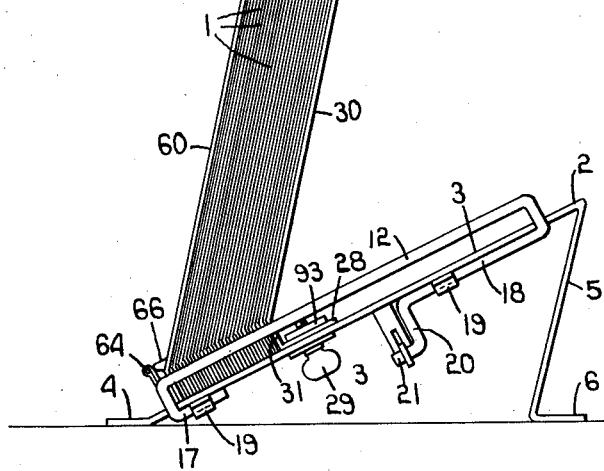
Figure 16:
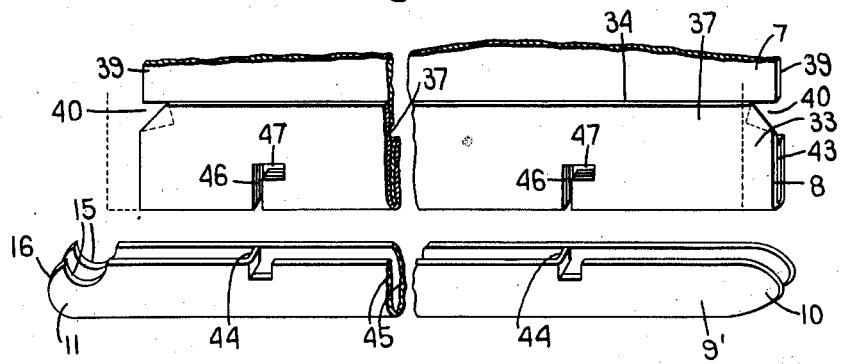
Figure 17:
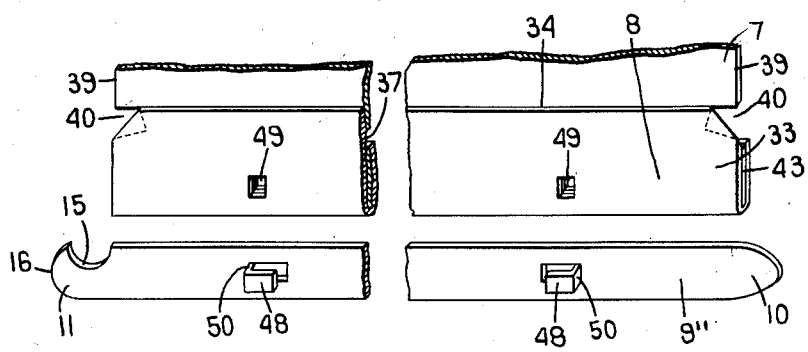
Figure 18:
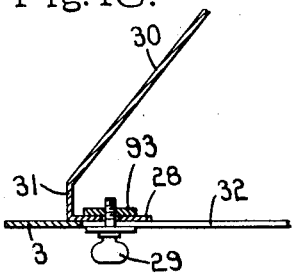
Figure 19:
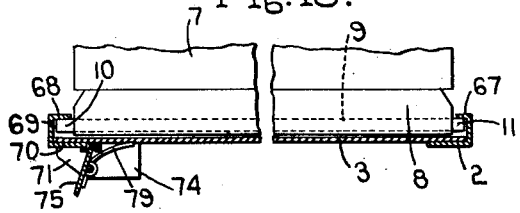

Fig. 2ª is a partial underside view of the frame shown in Figs. 1 and 2;

Figs. 3, 4 and 5 are enlarged sectional views on the line 3—3, Fig. 2, said views showing the operation of the hold-down;

Fig. 6 is a fragmentary view showing the lock for the hinged front;

Fig. 7 is a section of a card on the line 7—7, Fig. 3;

Fig. 8 is a perspective view of a different embodiment of my invention;

Fig. 9 is a side view of Fig. 8;

Fig. 10 is an underside view of Fig. 8;

Fig. 11 is a section on the line 11—11, Fig. 10;

Fig. 12 is a detail view showing the manner in which the index cards are detachably held in the frame;

Fig. 13 is an enlarged fragmentary view of one of the index cards;

Fig. 14 is a section on the line 14—14, Fig. 13;

Fig. 15 is a sectional view similar to Fig. 14, showing a different form of the invention;

Figs. 16 and 17 are fragmentary views showing different embodiments of the invention;

Fig. 18 is a sectional view on the line 18—18, Fig. 10;

Fig. 19 is a view similar to Fig. 3 showing a still different embodiment of the invention.

The index leaves are indicated generally at 1 and they are removably sustained on a frame 2. This frame, which can conveniently be made of sheet metal, is provided with the inclined card-receiving portion 3 and is provided at its front end with legs or feet 4 and at its rear end with the portion 5 having feet 6 at its lower edge. This frame can be conveniently bent into shape from sheet metal.

The frame is provided with a back or follower 27 which can be adjusted toward and from the front of the frame and also with a front 60 which is hinged to the frame. The index cards 1 are received between the back and the front, and the back will be adjusted nearer to or farther from the front, depending on the number of index cards which are being used. The front 60 is hinged to the frame by the hinges 61, and said front is provided on its front face with the rests 62. When the index cards are to be used, the front is swung forwardly into the position shown in Fig. 2, in which position it forms a support for the index cards.

I have provided means for locking the front in its closed position at times when the index is not being used. This locking means comprises a button 64 pivoted to the frame at 65 and adapted to be swung upwardly into contact with the projection 66 on the lower end of the front.

The index cards 1 are each made with a leaf portion 7 on which any desired data may be placed, and a stub portion 8 which is hinged to the leaf portion. Suitable means are provided which coöperate with the stub portions of the various cards to secure them to the frame. The hinge construction of the index cards permits ready access to any card by swinging the leaf portions of all the cards in front of the desired card forwardly onto the open front 60, as shown in dotted lines Fig. 2. The stub portions 8 of the various index leaves are provided at their ends with retaining projections and the frame 2 is provided at each edge with hold-down or locking members which coöperate with the retaining projections to hold the index cards in place. One of these hold-downs is movably mounted so that it can be moved into or out of locking engagement with the retaining projections of the index cards. When it is moved into locking engagement with said projections, then all the index cards are securely locked to the frame, but when said hold-down is moved out of locking engagement, then any individual card can be removed from the frame or replaced therein.

The stub portion 8 will preferably be made of fabric so as to give it added strength, the fabric also providing the hinged connection between the stub portion and the leaf portion. In the construction shown in Figs. 1–8, the retaining projections on the stub portion are formed as integral parts of the stub, while in Figs. 12–17, these retaining projections are formed on a retaining member which is separate from and removably secured to the stub.

In Fig. 7 I have shown the stub as made from a piece of fabric 33, one edge 34 of which is glued to the lower edge of the leaf 7. The body of the fabric is folded over to constitute the stub 8, and preferably a stiffening member 43 will be interposed between the two plies of the stub so as to give the latter added stiffness. The portion 37 of the fabric between the part of double thickness and the edge 34 that is glued to the lower edge of the leaf 7 constitutes the hinge section by which the stub and leaf are flexibly connected together. In this embodiment, the retaining projections on the stub are indicated at 95 and are formed by providing slots 96 in the ends of the stub.

The other forms of stub herein illustrated will be presently described.

The hold-down or locking devices which coöperate with the retaining projections 95 are indicated at 67 and 68, respectively, each retaining projection being in the form of an inwardly-directed flange or rib extending along the side of the frame. The hold-down 67 is rigid with the frame and the hold-down 68 is movably connected to the frame. The hold-down 67 may conveniently be formed by simply bending the edge of the frame into a shape to form the inwardly-directed rib or flange. The hold-down 68 is formed on the edge of the upturned portion 69 of a plate-like member 70 which extends under the edge of the frame 2 and is mounted for movement toward and from said edge. Said plate 70 is held in position by the fingers 71 extending from the brackets 74 that are secured to the bottom of the frame, and also by the screw 72 which operates in the slot 73. The brackets 74 have a rod 83 pivotally journaled therein on which is supported a controlling member 75 which is provided with two fingers 76 entering slots 77 formed in the plate 70, said controlling member being bent to provide a finger-piece 78 by which it may be manipulated. This actuator is acted upon by a spring 79 which tends to throw the lower end thereof outwardly and the fingers 76 inwardly. The tendency of the spring 79, therefore, is to hold the hold-down member 68 in its operative position shown in Fig. 3.

When the index cards are assembled, the retaining projections 95 are confined beneath the hold-downs 67, 68, and the depth of the slots 96 is such that the cards are not permitted to have sufficient transverse movement to disengage either retaining projection from its hold-down. Hence the index cards will be positively held to the frame.

When pressure is applied to the finger-piece 78 of the actuator 75, and the latter is swung into the position shown in Fig. 4, the hold-down 68 will be given a receding or backward movement thereby to partially withdraw it from the retaining projections 95 of the index cards. When the hold-down 68 is in this position, then any individual card can be shifted laterally toward said hold-down a sufficient distance to disengage the retaining projection on the opposite edge of the index card from the hold-down 67, thus permitting said card to be removed from the frame. It will be noted that the hold-down 68 has a greater width than the hold-down 67 and the purpose of this is to provide a construction in which the moving of the receding hold-down into its inoperative position will not completely withdraw it from the corresponding retaining projection 95. The receding movement of the hold-down 68 is sufficient, however, so that when it is in its retracted position any index card can be moved laterally sufficiently to disengage the retaining projection from the fixed hold-down 67. With this construction, therefore, there is no liability that the index cards will become disengaged or accidentally detached from the frame when the hold-down 68 is moved into its retracted position. When, however, said hold-down is in its retracted position, any card can be readily removed from the frame or replaced therein. So long as the hold-down 68 is in its forward position all the cards are securely locked to the frame. With this construction the operation of removing any card from the frame involves simply depressing the finger-piece 78, as shown in Fig. 4, and then shifting the desired card laterally sufficiently to withdraw its retaining projection 95 from the hold-down 67, as shown in Fig. 5, and then withdrawing the card from the frame.

In Figs. 12–17 I have shown a construction in which the retaining projections are formed on the end of a retaining or anchoring member 9 which is removably secured to the stub portion 8 of the index card. This retaining member is in the form of a strip or wire which is longer than the stub so that the ends 10 and 11 project beyond the stub and these ends are adapted to be engaged by the hold-down members of the frame. The stub with the removable retaining member may be used in connection with the form of hold-down above described, as seen in Fig. 19, or it may be used with the hold-down construction shown in Figs. 8 to 12 and which comprises two hold-down members 12 and 13 in the form of wire loops that extend along the edges of the frame and are adapted to have the ends 10 and 11 of the retaining members inserted thereunder. The hold-down member 13 is shown as rigidly secured to the base 3 of the frame and the hold-down member 12 is movably secured thereto so that it can be swung from its full line operative position shown in Fig. 11, in which it has locking engagement with the ends 10 of the retaining members, into its inoperative or unlocked position shown in dotted lines Figs. 11 and 12. When the locking member 12 is in its operative position it overlies the ends 10 of the retaining members and also lies closely adjacent the ends 14 of the stubs 8. In this position of the locking member the stubs will be securely locked to the base 3 because the engagement of the locking members with the ends of the stubs will prevent lateral movement of the index members and the fact that the locking members overlie the ends 10 and 11 of the retaining member will prevent the index cards from being withdrawn.

When the locking member 12 is swung into its inoperative or unlocked position shown in dotted lines Figs. 11 and 12, then any index card can be readily removed from the frame. I will preferably make the end 11 of each retaining member with a notch 15 to receive the locking member 13, and said end will be formed with the rounded surface 16 so as to permit it to be inserted under or withdrawn from the locking member 13 by a swinging movement, as shown in Fig. 12. The advantage of this construction is that the index cards will still be retained in position by the locking member 13 when the locking member 12 is thrown into its inoperative position, but any individual index card can be readily removed by simply swinging it about the locking rod 13 as a center.

The locking member 12 may be moved from its operative into its inoperative position and vice versa by any suitable means. As herein shown said locking member is formed from a piece of wire having the portions 17 and 18 which underlie the portion 3 of the frame and are journaled in suitable bearings 19, thus permitting the member 12 to swing from the full to the dotted line position, as shown in Figs. 11 and 12. The portion 18 is provided with the offset arm 20, the end of which is bent laterally, as shown at 21, and is operating in a slot 22 formed in a lever 23 which is pivoted at 24 to the underside of the base 3, said lever being provided with the thumb-piece 25 by which it may be depressed. The lever is acted upon by the spring 26 which normally holds it in the full line position, Fig. 11. When the thumb-piece is depressed, however, the lever will act on the end 20 of the locking member 12 and swing the same into its dotted line position.

The follower 27 is in the form of a piece of sheet metal which is bent to provide the foot portion 28 that overlies the base 3, the body portion 30 against which the cards rest, and the intermediate portion 31 which extends at right angles to the base. This foot portion 28 is clamped to the base by means of a clamping screw 29 which extends through a slot 32 formed in the base and has screw-threaded engagement with an elongated clamping nut 93 that overlies the base and engages the portion 28. The follower can be readily adjusted toward or from the front of the frame by simply loosening the clamping screw 29 and then moving said screw in the slot 32.

As stated above, the retaining members 9 are removable from the index cards. This removability may be provided for in various ways, some of which are illustrated in the drawings.

In Fig. 14 I have shown a construction wherein the stub 8' is made from a piece of fabric 33'', the upper edge 34 of which is glued or secured to the lower edge of the leaf 7. The lower portion of said fabric strip is folded to form the loop 35 into which the retaining member 9 may be inserted. In this construction the edge 36 of the fabric strip is glued or secured directly to the body thereof. The portion 37 of the fabric between the loop 35 and the leaf 7 constitutes the hinge portion of the index card. In order to facilitate the insertion of the retaining member 9 into the loop 35, I will preferably form one side face of the loop at one edge of the stub portion with a notch 38, as clearly seen in Fig. 13. When the retaining member 9 is to be inserted, the tip 10 of said retaining member is placed in the notch 38, and said notch acts as a guide to facilitate the entrance of said member into the loop.

Each side edge 39 of the leaf 7 is notched, as shown at 40, at a point in line with the upper edge of the fabric 33, and the corner 42 of the fabric is then folded over the inclined wall of the notch and glued or cemented to the front face of the leaf. The purpose of this construction is to make a selvage edge at this point so as to prevent the fraying or raveling of the fabric.

In Fig. 15 I have shown a construction similar to that shown in Fig. 14 except that a strip 43 of cardboard is introduced between the body of the fabric 33' and the portion 36. This strip acts as a stiffener to give more body and stiffness to the stub portion 8'' of the card.

In Figs. 16 and 17 I have illustrated some different embodiments of the invention. In Fig. 16 the retaining member 9' is made U-shape in cross-section, and the lower edge of the stub portion is inserted into the U. This retaining member is provided with locking fingers 44 which extend transversely across the space between the sides 45. The stub 8 is provided with the slots 46 which extend from the lower edge thereof and are provided with the lateral extensions 47. In connecting the stub to the retaining member the lower edge of the stub is inserted into the space between the sides of the retaining member with the locking fingers 44 entering the slots 46. When the stub is fully inserted into the locking member, then the stub is moved laterally into the dotted line position, Fig. 16, thereby to cause the locking fingers to enter the lateral projections 47. When the stub is connected to the frame with the ends of the retaining member under the locking members 12 and 13, said locking members will prevent any lateral movement of the stub which will permit it to be disconnected from the retaining member, and the retaining member and stub will thus be firmly locked to the frame.

In Fig. 17 I have shown a construction in which the retaining member 9'' is provided with two laterally-extending fingers 50, the ends 48 of which are bent into parallelism with the retaining member but extend in opposite directions, and in which the stub 8 is provided with apertures 49 to receive the fingers 50. In applying the stub to the member 9 the stub will be bent centrally sufficiently to permit the laterally-extending portions 48 of the fingers to be passed through the apertures 49, and when the fingers 50 are in the apertures, the stub will be locked to the retaining member.

In some of the illustrated embodiments of my invention the projections on the stub with which the hold-downs coöperate are made integral with the stub, and in the other embodiments they are detachably secured to the stub. In the construction shown in Figs. 1–5, the distance between the hold-downs when they are separated and the hold-down 68 is in its retracted position is slightly less than the distance between the ends of the projections 95. The advantage of this is that the moving of the hold-down 68 into its retracted position does not withdraw it from engagement with the projections 95 of the stubs, and hence there is no danger that any of the cards will be accidentally dislodged from the frame when said hold-down is thus retracted. Any desired card can, however, be readily removed by simply shifting it laterally into the position shown in Fig. 5 thereby to disengage the projection from the fixed hold-down 67.

So far as the operation of the hold-downs 67 and 68 is concerned it is immaterial whether the projections with which the hold-downs engage are integral with the stub, as shown in Figs. 3, 4 and 5, or are separable therefrom, as shown in Fig. 19.

While I have illustrated herein some selected embodiments of my invention, I do not wish to be limited to the constructional features shown.

I claim:

1. In a card index, the combination with a frame, of a plurality of index cards, each having a stub portion and a leaf portion hinged together, a retaining member removably secured to each stub portion, and hold-down members on the frame coöperating with the retaining members for removably holding the index cards in place.

2. The combination with a frame having a card-receiving portion and a follower adjustably secured thereto, of a plurality of index cards sustained by said card-receiving portion and normally supported in vertical position by said follower, each card having two retaining projections on opposite edges, a hold-down fixed to the frame and extending longitudinally thereof at one edge and adapted to engage the retaining projections on one edge of the index cards, another hold-down movably supported by the frame and adapted to engage the retaining projections on the other edge of the cards, and means to move the movable hold-down into and out of operative position.

3. In a card index, the combination with a frame, of a plurality of index cards, each having a stub portion and a leaf portion hinged together, a retaining member carried by each stub portion and extending beyond the ends of the latter, and hold-down members on the frame coöperating with said retaining members for removably holding the latter in place.

4. In a card index, the combination with a frame, of a plurality of index cards, each having a retaining member removably carried thereby and projecting beyond the sides thereof, and two hold-downs carried by the frame and adapted to overlie the projecting ends of the retaining members, one of the hold-downs being movably mounted on the frame, and means to move said hold-down into and out of operative position.

5. In a card index, the combination with a frame, of a plurality of index cards, a retaining member associated with each card, each retaining member projecting beyond opposite sides of the card, and two hold-downs carried by the frame and adapted to overlie the projecting ends of the retaining members thereby to hold the cards to the frame, said hold-downs being constructed to prevent movement of the retaining members transversely of the cards.

6. In a card index, the combination with a frame, of a plurality of index cards each having two retaining projections on opposite edges, two hold-down members carried by the frame and adapted to engage said retaining projections, one of the hold-down members being movable relative to the other to permit any individual index card to be removed, and means to limit the receding movement of the movable hold-down member to a position in which the distance between the hold-down members is slightly less than the distance between the ends of the projections on opposite edges of any card.

7. In a card index, the combination with a frame having a card-supporting portion, of a back or follower adjustably secured to the frame, a plurality of index cards detachably secured to the frame and normally resting against the back or follower but adapted to swing forwardly therefrom, a front member pivotally connected to the frame and adapted to swing downwardly to form a support for the index cards which have been swung forwardly said front having a projection at its lower edge, and a button carried by the frame and adapted to engage said projection and hold the front in vertical position.

8. In a card index, the combination with a frame having a card-supporting portion, of a back or follower adjustably secured to the frame, a plurality of index cards detachably secured to the frame and normally resting against the back or follower but adapted to swing forwardly therefrom, a front member pivotally connected to the frame and adapted to swing downwardly to form a support for the index card which have been swung forwardly, and means at the lower edge of said front to lock it in its vertical position.

9. An index card for a card index comprising a leaf portion and a stub portion, the latter being formed from fabric which is secured to the lower edge of the leaf portion and a portion of the fabric constituting a hinge connection between the leaf portion and stub portion, each leaf portion being notched at its edge and the fabric being folded around the edge of the leaf portion at said notch.

In testimony whereof I have signed my name to this specification.

STANLEY ANTHONY.